(12) United States Patent
Park et al.

(10) Patent No.: US 7,920,202 B2
(45) Date of Patent: Apr. 5, 2011

(54) APPARATUS AND METHOD TO CONTROL FOCUSING OF PHOTOGRAPHING DEVICE

(75) Inventors: Byung-kwan Park, Yongin-si (KR); Seong-deok Lee, Yongin-si (KR); Hyun-hwa Oh, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1042 days.

(21) Appl. No.: 11/727,837

(22) Filed: Mar. 28, 2007

(65) Prior Publication Data
US 2008/0018776 A1 Jan. 24, 2008

(30) Foreign Application Priority Data

May 19, 2006 (KR) .................. 10-2006-0045278

(51) Int. Cl.
*H04N 5/232* (2006.01)
(52) U.S. Cl. ..................................... 348/349
(58) Field of Classification Search ............ 348/345, 348/349, 353
See application file for complete search history.

(56) References Cited

U.S. PATENT DOCUMENTS

| 7,834,915 | B2 * | 11/2010 | Wakazono et al. | 348/229.1 |
| 2001/0000674 | A1 * | 5/2001 | Yasuda | 348/349 |
| 2008/0298789 | A1 * | 12/2008 | Ohki | 396/52 |
| 2010/0134643 | A1 * | 6/2010 | Koishi | 348/222.1 |

FOREIGN PATENT DOCUMENTS

| JP | 07-030798 | 1/1995 |
| JP | 07-162731 | 6/1995 |
| JP | 2000-258681 | 9/2000 |

* cited by examiner

*Primary Examiner* — Tuan Ho
(74) *Attorney, Agent, or Firm* — Staas & Halsey LLP (57) ABSTRACT

An apparatus and method to control the focusing of a photographing device, in which a light source portion is removed from an image, is provided. The focusing of the photographing device is controlled according to whether the image is in a high- or low-illuminance state. The apparatus includes a luminance detection unit detecting respective luminance values of pixels included in an image; a filter unit outputting values corresponding to the detected luminance values; a threshold calculation unit counting a number of pixels having luminance values greater than a predetermined value among the luminance values of the pixels included in the image and calculating a threshold value using a ratio of the counted number of pixels to a total number of pixels included in the image; and a control unit controlling a position of a lens using output values greater than the calculated threshold value among the output values.

8 Claims, 9 Drawing Sheets

APPARATUS AND METHOD TO CONTROL FOCUSING OF PHOTOGRAPHING DEVICE

CROSS-REFERENCE TO RELATED APPLICATIONS

This application claims priority from Korean Patent Application No. 10-2006-0045278 filed on May 19, 2006 in the Korean Intellectual Property Office, the disclosure of which is incorporated herein by reference in its entirety.

BACKGROUND OF THE INVENTION

1. Field of the Invention

The present invention relates to an apparatus and method to control the focusing of a photographing device, and more particularly, to an apparatus and method to control the focusing of a photographing device, the apparatus and method capable of removing a light source portion from an image and controlling the focusing of the photographing device according to whether the image is in a high-illuminance state or a low-illuminance state.

2. Description of the Related Art

Generally, photographing devices, such as camcorders and cameras, photoelectrically convert optical signals incident through a lens into electrical signals and perform a predetermined image processing operation on the photoelectrically converted image signals. In this way, the photographing devices perform a photographing operation. Photographing devices perform a focusing operation using an automatic focusing method or a manual focusing method.

In the automatic focusing method, the position of a lens is automatically adjusted to a position having maximum auto focus data in an area between a subject and the lens located a predetermined distance away from the subject. The auto focus data denotes a contrast value according to a luminance value in the area between the subject and the lens. When the automatic focusing method is used, the position of the lens is automatically adjusted to a position that provides the clearest image without user manipulation.

In addition, while photographing a main subject in a stable manner, if a photographing device senses a large change in the auto focus data, the lens of the photographing device focuses on a new subject.

In a backlight state, if the lens is out of focus, the outline of a light source becomes large due to blurring. In this case, if the automatic focusing method in which the lens is focused based on luminance is used, the outline of the light source becomes large even when the lens is out of focus, and thus the auto focus data becomes maximized.

Furthermore, in a low illuminance state, there is little difference in contrast according to luminance between when the lens is in focus and when the lens is out of focus. Therefore, it is difficult to precisely focus the lens.

Japanese Patent Publication No. 1995-030798 discloses a conventional auto focus camera detecting a high-luminance component, controlling a reference level of a high pass filter (HPF) by adjusting an amplification factor of an image signal, and calculating a focusing estimate by removing a low-level signal from an output of the HPF. However, the conventional auto focus camera sets the reference level of the HPF according to the amplification factor by which an average level of an image is amplified. Therefore, if a light source portion exists in the image, an edge component becomes large when the lens is out of focus. Accordingly, an output value of the HPF becomes large.

SUMMARY OF THE INVENTION

Accordingly, it is an aspect of the present invention to provide an apparatus and method to control the focusing of a photographing device, the apparatus and method capable of removing a light source portion from an image and adaptively setting a threshold value used to output values corresponding to luminance values of pixels included in the image according to whether the image is in a high-illuminance state or a low-illuminance state.

Additional aspects and/or advantages of the invention will be set forth in part in the description which follows and, in part, will be apparent from the description, or may be learned by practice of the invention.

The foregoing and/or other aspects of the present invention are achieved by providing an apparatus to control the focusing of a photographing device. The apparatus includes a luminance detection unit detecting respective luminance values of pixels included in an image of a subject; a filter unit outputting values corresponding to the detected luminance values; a threshold calculation unit counting the number of pixels having luminance values greater than a predetermined value and calculating a threshold value using a ratio of the counted number of pixels to a total number of pixels included in the image; and a control unit controlling a position of a lens to focus on the subject using output values greater than the calculated threshold value among the output values of the filter unit.

The foregoing and/or other aspects of the present invention are also achieved by providing an apparatus to control a focusing of a photographing device. The apparatus includes a luminance detection unit detecting respective luminance values of pixels included in an image of a subject; a threshold calculation unit calculating a threshold value using a difference between a sum of the detected luminance values and a sum of luminance values greater than a reference value; a filter unit outputting values corresponding to luminance values of pixels less than a predetermined value among the detected luminance values; and a control unit controlling a position of a lens to focus on the subject using output values greater than the calculated threshold value among the output values of the filter unit.

The foregoing and/or other aspects of the present invention are also achieved by providing a method of controlling a focusing of a photographing device. The method includes detecting respective luminance values of pixels included in an image of a subject; outputting values corresponding to the detected luminance values; counting the number of pixels having luminance values greater than a predetermined value and calculating a threshold value using a ratio of the counted number of pixels to a total number of pixels included in the image; and controlling a position of a lens to focus on the subject using output values greater than the calculated threshold value among the output values.

The foregoing and/or other aspects of the present invention are also achieved by providing a method of controlling a focusing of a photographing device. The method includes detecting respective luminance values of pixels included in an image of a subject; calculating a threshold value using a difference between a sum of the detected luminance values and a sum of luminance values greater than a reference value; outputting values corresponding to luminance values of pixels less than a predetermined value among the detected luminance values; and controlling a position of a lens to focus on the subject using output values greater than the calculated threshold value among the output values.

BRIEF DESCRIPTION OF THE DRAWINGS

The above and other features and aspects of the invention will become more apparent by describing in detail embodiments thereof with reference to the attached drawings, in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Hereinafter, an apparatus and method of controlling the focusing of a photographing device according to embodiments of the present invention will be described with reference to block diagrams or flowchart illustrations. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which execute via the processor of the computer or other programmable data processing apparatus, allow for the implementation of the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the functions specified in the flowchart block or blocks.

The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations to implement the functions specified in the flowchart block or blocks.

Each block of the flowchart illustrations may represent a module, segment, or portion of code, which includes one or more executable instructions to implement the specified logical function(s). It should also be noted that in some alternative implementations, the functions noted in the blocks may occur in a different order. For example, two blocks shown in succession may in fact be executed substantially concurrently or the blocks may sometimes be executed in the reverse order, depending upon the functionality involved. In the embodiments of the present invention, a photographing device denotes any device that can acquire an image of a subject and store the acquired image. Therefore, the photographing device in the embodiments of the present invention may be a digital camera or any device that can acquire and store an image, such as a personal digital assistant (PDA) or a cellular phone.

Figure 1:
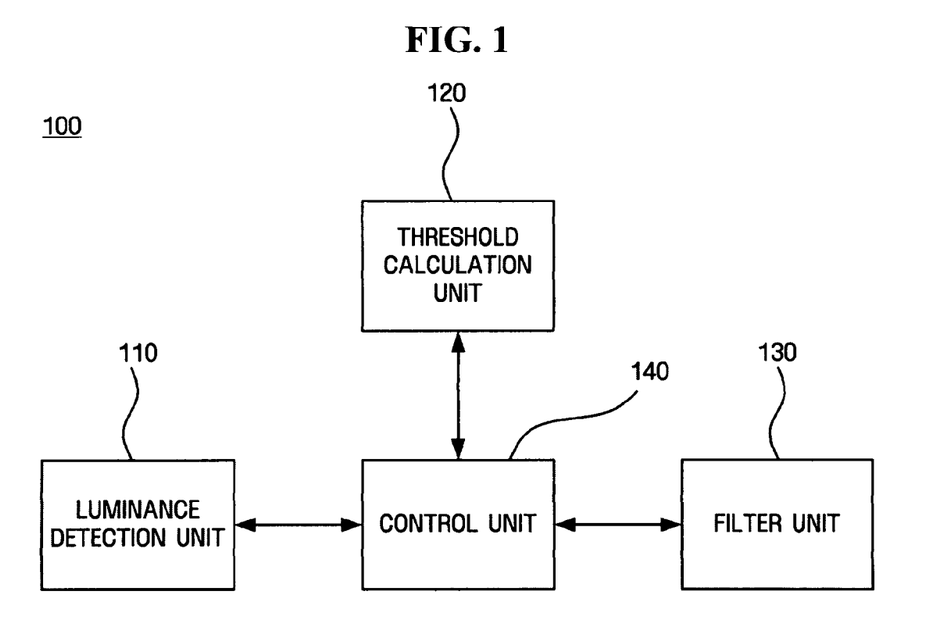
FIG. 1 is a block diagram of an apparatus to control a focusing of a photographing device according to an embodiment of the present invention.

FIG. 1 is a block diagram of an apparatus 100 to control the focusing of a photographing device according to an embodiment of the present invention.

Referring to FIG. 1, the apparatus 100 may include a luminance detection unit 110, a threshold calculation unit 120, a filter unit 130, and a control unit 140.

The luminance detection unit 110 detects a luminance value of each pixel in an image acquired by the photographing device according to a first embodiment of the present invention. In the present embodiment, a case where the luminance detection unit 110 detects the luminance value of each pixel in an image will be described. However, this is merely an example used to help promote the understanding of the present invention, and the present invention is not limited thereto. In other words, a saturation and brightness of each pixel in the image may also be detected.

The threshold calculation unit 120 calculates a threshold value based on the number of pixels having luminance values greater than a predetermined value or the sum of luminance values greater than a reference value. The threshold value calculated according to the present embodiment may be used to control the position of a lens. That is, the position of the lens may be adjusted to a position having a maximum sum of output values greater than the calculated threshold value among values output from the filter unit 130 when the control unit 140, which will be described later, controls the focusing of the photographing device. In the present embodiment, the control unit 140 determines the output values greater than the calculated threshold value. However, the present invention is not limited thereto. The filter unit 130 may output values greater than the calculated threshold value. A case where the threshold calculation unit 120 calculates a threshold value based on the number of pixels having luminance values greater than a predetermined value among respective luminance values of pixels included in an image according to a first embodiment of the present invention will now be described.

The threshold calculation unit 120 counts the number of pixels having luminance values greater than a predetermined value among respective luminance values of pixels included in an image. The threshold calculation unit 120 may also calculate a mean of the luminance values of the pixels included in the image. The mean may be calculated by dividing the sum of the luminance values of the pixels included in the image by the total number of pixels. The number of pixels counted by the threshold calculation unit 120 may be understood to be a light source portion of the image.

The threshold calculation unit 120 may also calculate a threshold value by adding the calculated mean to a ratio of the number of pixels having luminance values greater than the predetermined value to the total number of pixels included in the image. The calculated threshold value T may be give by Equation (1).

$$T=[(A+(TN/TA))\times w1]\times w2, \quad (1)$$

where A indicates the mean of luminance values of all pixels in an image calculated by the threshold calculation unit 120, TN indicates the number of pixels having luminance values greater than a predetermined value among the luminance values of the pixels in the image, TA indicates the total number of pixels in the image and w1 and w2 indicate predetermined first and second weights, respectively. Hereinafter, the threshold value T calculated according to the first embodiment of the present invention will be referred to as a 'first threshold value.'

As described above, when the threshold calculation unit 120 calculates the first threshold value using Equation (1), the threshold calculation unit 120 counts the number of pixels having luminance values greater than a predetermined value in order to not to be affected by a light source portion of an image. In other words, if the light source portion exists in the image, it causes blurring, which may increase the sum of output values of the filter unit 130 when the lens is out of focus. The threshold calculation unit 120 counts the number of pixels having the luminance values greater than the predetermined value to prevent such an increase in the sum of the output values of the filter unit 130 when the lens is out of focus.

A high pass filter (HPF) receiving a luminance value of each pixel in an image and outputting a value according to the received luminance value, used as the filter unit 130, will now be described as an example.

The filter unit 130 may output a value according to a luminance value of a pixel based on an m×m mask with the pixel at its center in an image. In the present embodiment, a 3×3 mask with a pixel at its center will be described.

Figure 2:
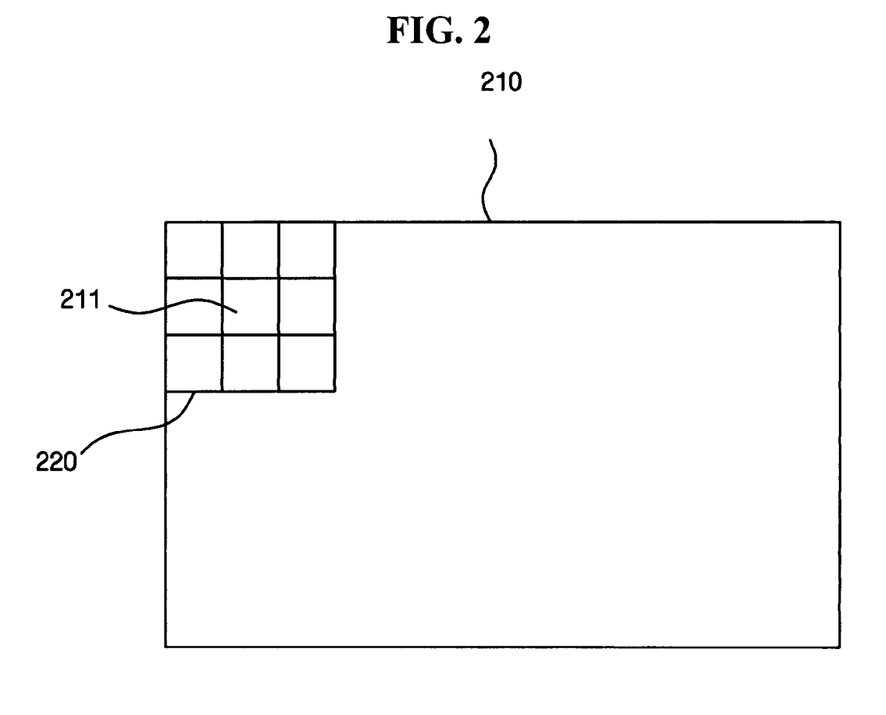
FIG. 2 illustrates a mask used by a filter unit according to an embodiment of the present invention.
Figure 3:
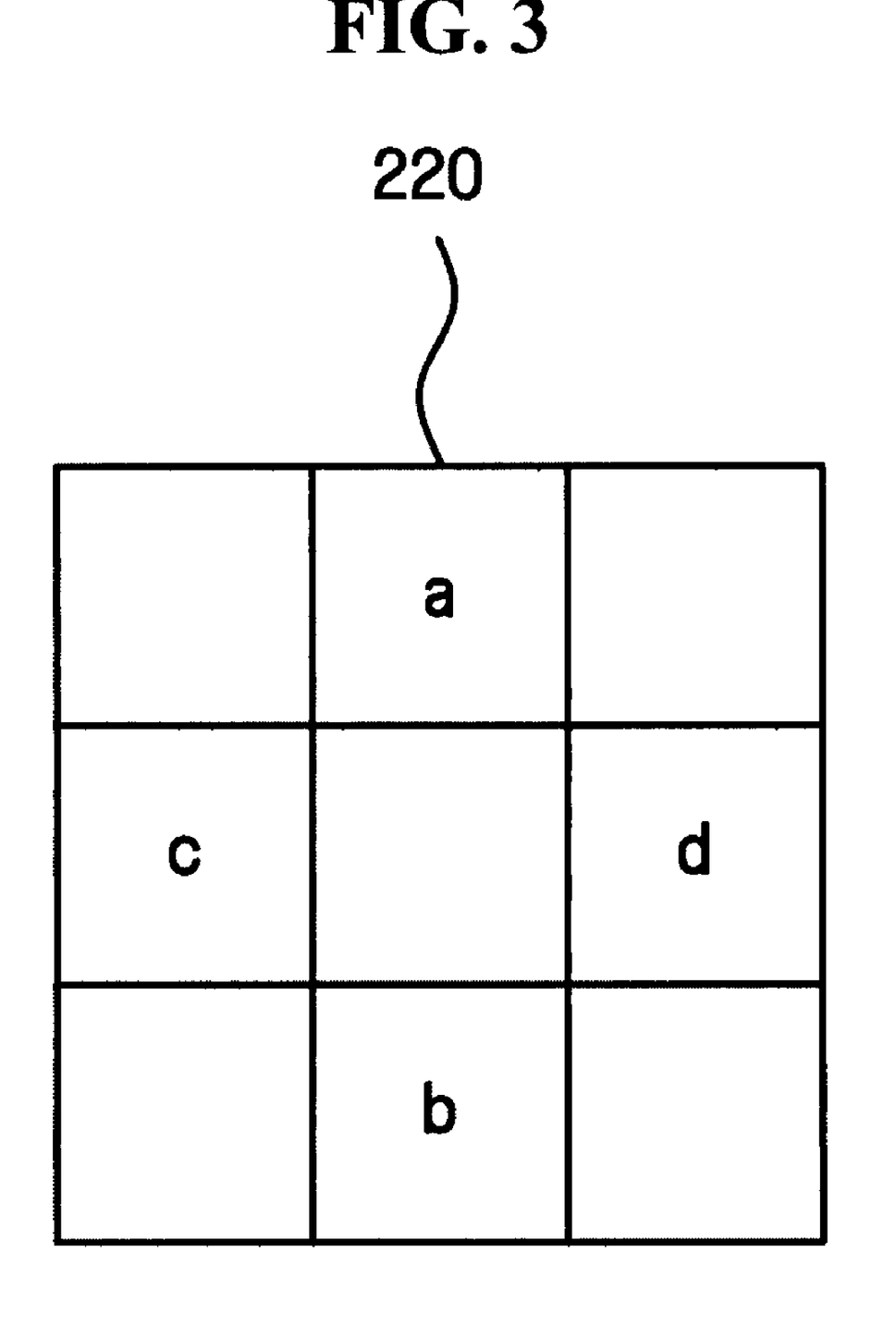
FIG. 3 illustrates weights assigned to a mask according to an embodiment of the present invention.

Specifically, as illustrated in FIG. 2, the filter unit 130 may output a value for a pixel 211 based on a 3×3 mask 220 with the pixel 211 at its center in an image 210. Referring to FIG. 3, predetermined weights a, b, c and d are assigned to the 3×3 mask 220 in vertical and horizontal directions from the pixel 211 located at the center of the 3×3 mask 220.

The filter unit 130 may also output a value in the vertical direction or a value in the horizontal direction, whichever is greater, as a final output value. In other words, the output value in the vertical direction is $|a*l(i-1,j)+b*l(i+1,j)|$, and the output value in the horizontal direction is $|c*l(i,j-1)+d*l(i,j+1)|$. If $l(i,j)$ is the luminance value of the pixel 211 at the center of the 3×3 mask 220, the vertical direction is defined as an i axis, and the horizontal direction is defined as a y axis, it may be understood that $l(i-1,j)$, $l(i+1,j)$, $l(i,j-1)$, and $l(i,j+1)$ are the luminance values of pixels located in the vertical and horizontal directions from the pixel 211 at the center of the 3×3 mask 220. In this case, the filter unit 130 may output $|a*l(i-1,j)+b*l(i+1,j)|$ or $|c*l(i,j-1)+d*l(i,j+1)|$, whichever is greater, as the final output value. If $|a*l(i-1,j)+b*l(i+1,j)|$ is greater, it may be understood that an edge exists in the vertical direction. Conversely, if $|c*l(i,j-1)+d*l(i,j+1)|$ is greater, it may be understood that the edge exists in the horizontal direction.

The control unit 140 compares the output value of the filter unit 130 with the first threshold value calculated using Equation (1) described above and determines the output value to be valid only when the output value is greater than the first threshold value.

Next, the control unit 140 calculates the sum of output values greater than the first threshold value and moves the lens to acquire an image of a subject to a position having a maximum sum. As described above, the light source portion of the image was excluded when the threshold calculation unit 120 calculated the threshold value. Therefore, when the lens is out of focus, an increase in the sum of the output values of the filter unit 130 due to blurring caused by the light source portion of the image may be prevented.

A second embodiment of the present invention will now be described in which the threshold calculation unit 120 calculates a threshold value based on the sum of luminance values greater than a reference value.

The threshold calculation unit 120 calculates the sum of luminance values of pixels which are greater than a reference value. Then, the threshold calculation unit 120 calculates a mean by dividing the difference between the sum of luminance values of all pixels in an image and the sum of the luminance values of the pixels which are greater than the reference value by the total number of pixels included in the image.

If the mean calculated by the threshold calculation unit 120 is greater than a predetermined value, a third weight is assigned to the calculated mean to obtain a threshold value. If the mean calculated by the threshold calculation unit 120 is not greater than the predetermined value, a fourth weight is assigned to the calculated mean to obtain a threshold value. In the second embodiment of the present invention, the threshold value obtained after the third weight is assigned to the calculated mean will hereinafter be referred to as a 'second threshold value,' and the threshold value obtained after the fourth weight is assigned to the calculated mean will hereinafter be referred to as a 'third threshold value.' In addition, the third and fourth weights assigned to the calculated mean to obtain the second and third threshold values, respectively, may be distinguished according to the number of luminance values greater than the reference value. In other words, if the mean calculated by the threshold calculation unit 120 is greater than the predetermined value, the number of luminance values greater than the reference value is small. If the mean calculated by the threshold calculation unit 120 is less than the predetermined value, the number of luminance values greater than the reference value is relatively large.

A relatively large or small number of luminance values greater than the reference value indicate that a light source portion exists or does not exist in an image. Therefore, by subtracting the sum of the luminance values greater than the reference value from the luminance values of all pixels in the image, the mean can be prevented from increasing due to the light source portion of the image. Accordingly, a threshold value can be set without being affected by the light portion of the image.

If the calculated mean is large, the image may be a high-contrast image. In this case, the second threshold value is increased to detect a strong edge portion. Then, the control unit 140 calculates largely different sums of output values when the lens is in focus and when out of focus. If the calculated mean is small, the image may be in a low-illuminance state. In this case, the threshold value (the third threshold value) is decreased such that even a relatively weak edge portion can also be considered.

Therefore, the threshold value used by the filter unit 130 in order to output a value may automatically be calculated according to the image.

The filter unit 130 may select the second threshold value or the third threshold value calculated by the threshold calculation unit 120 according to an environment where a subject is photographed. For example, the filter unit 130 may select the second threshold value or the third threshold value according to whether a subject is photographed in the low-illuminance state or the high-illuminance state while the backlight effect is excluded and performs a filtering operation using the selected threshold value.

Specifically, when the sum of the luminance values of a pixel and its neighboring pixels in an image of a subject is greater than a predetermined value, the filter unit 130 does not output a value in order to effectively remove a light source portion caused by backlight from the image and thus control the focusing of the photographing device on the subject using the outline of the remaining portions of the image. A case where the filter unit 130 does not output a value when the sum of luminance values of a pixel and its neighboring pixels in a 3×3 mask is greater than a predetermined value according to the present embodiment will now be described.

In the first embodiment of the present invention described above with reference to FIGS. 2 and 3, the filter unit 130 outputs a value according to a received luminance value. In the second embodiment of the present invention, the filter unit 130 may also output a value according to a received luminance value as in the first embodiment of the present invention.

If the sum of luminance values of a pixel and its neighboring pixels in an image is less than a predetermined value, the filter unit 130 may output a value corresponding to the luminance value of the pixel to effectively remove a light source portion from the image in the backlight state.

In addition, the filter unit 130 may compare an output value with a threshold value selected from the second and third threshold values which are calculated by the threshold calculation unit 120. If the output value is greater than the selected threshold value, the filter unit 130 outputs the output value. Otherwise, the filter unit 130 does not output the output value. In other words, the filter unit 130 detects a strong edge portion using the second threshold value in the high-illuminance state such that there is a large difference between the sums of output values of the filter unit 130 when the lens is in focus and when the lens is out of focus. In the low-illuminance state, the filter unit 130 considers even a relatively weak edge portion using the third threshold value.

Figure 4:
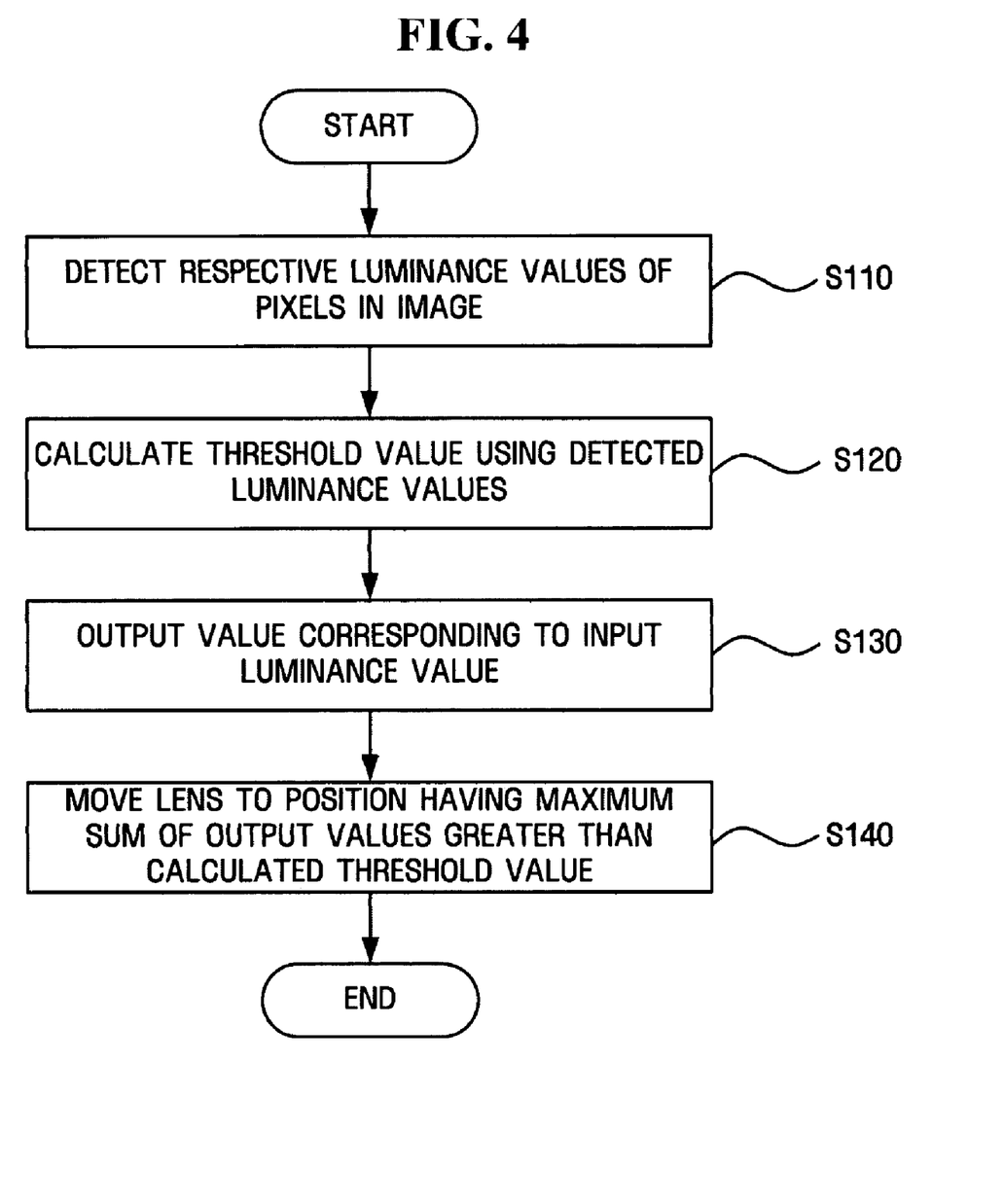
FIG. 4 is a flowchart illustrating a method of controlling the focusing of a photographing device according to an embodiment of the present invention.

FIG. 4 is a flowchart illustrating a method of controlling the focusing of a photographing device according to an embodiment of the present invention.

Referring to FIG. 4, the luminance detection unit 110 detects a luminance value of each pixel in a photographed image (operation S110). In the present embodiment, the luminance value of each pixel in the photographed image is detected. However, the present invention is not limited thereto. The saturation and brightness of each pixel in the photographed image may also be detected.

The threshold calculation unit 120 calculates a threshold value using the luminance values detected by the luminance detection unit 110 (operation S120). In the present embodiment, the threshold calculation unit 120 calculates the threshold value using the number of pixels having luminance values greater than a predetermined value or the sum of luminance values greater than a reference value among the detected luminance values. However, the threshold value calculated by the threshold calculation unit 120 may be any one of the first through third threshold values as described above.

The filter unit 130 receives a luminance value of a pixel in the image and outputs a value according to the received luminance value (operation S130). In the present embodiment, the filter unit 130 may output a value for a pixel using an m×m mask with the pixel at its center as described above with reference to FIGS. 2 and 3.

The control unit 140 moves a lens used to focus on a subject to a position having a maximum sum of output values greater than the threshold value calculated by the threshold calculation unit 120 among the output values of the filter unit 130 (operation S140).

Figure 5:
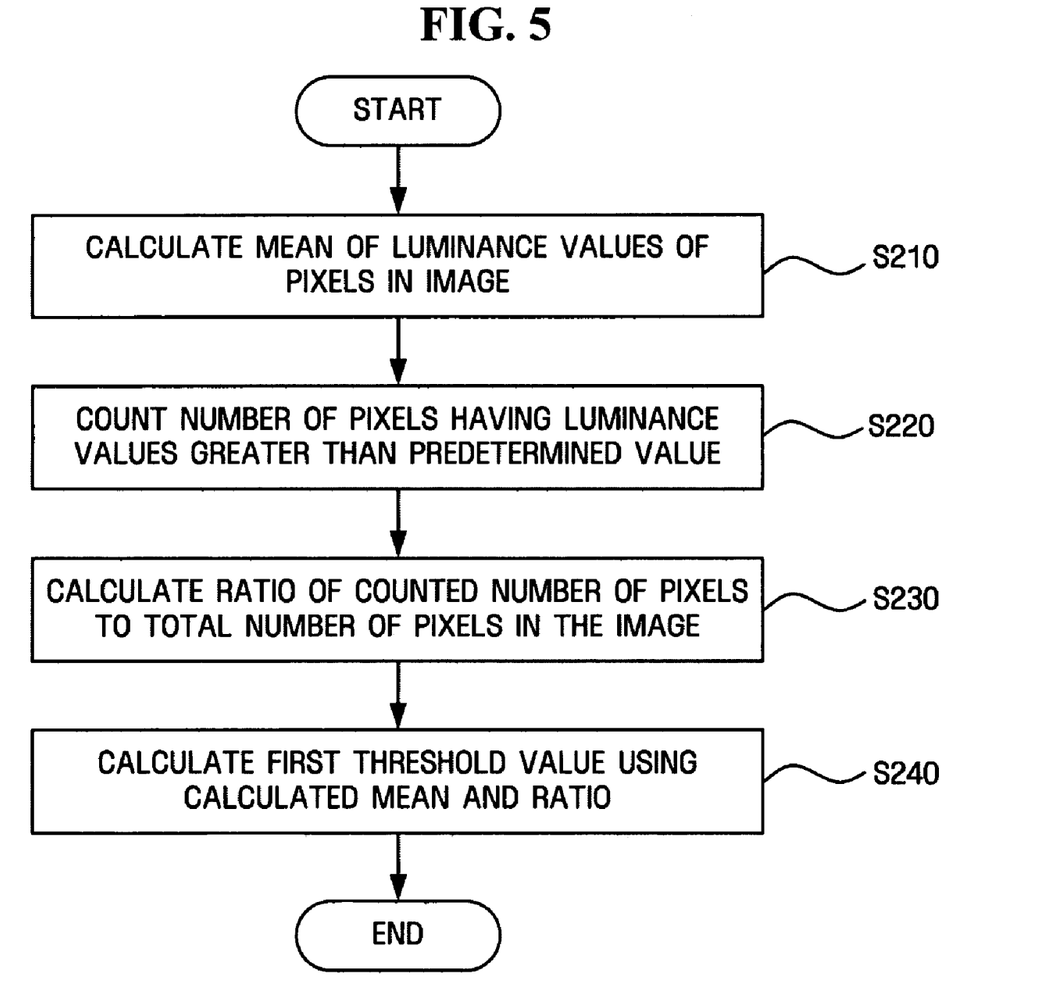
FIG. 5 is a flowchart illustrating a method of calculating a threshold value according to a first embodiment of the present invention.

FIG. 5 is a flowchart illustrating a method of calculating a threshold value according to a first embodiment of the present invention.

Referring to FIG. 5, the threshold calculation unit 120 calculates a mean of luminance values of all pixels in a photographed image (operation S210). Here, the mean of the luminance values of the pixels in the photographed image may be calculated by dividing the sum of the luminance values of the pixels in the image by the total number of pixels.

In addition, the threshold calculation unit 120 counts the number of pixels having luminance values greater than a predetermined value among the luminance values of the pixels in the image (operation S220).

The threshold calculation unit 120 divides the counted number of pixels by the total number of pixels in the image and calculates a ratio of the counted number of pixels to the total number of pixels in the image (operation S230).

Then, the threshold calculation unit 120 calculates the threshold value by adding the mean calculated in operation S210 to the ratio calculated in operation S230 (operation S240). In this case, the calculated threshold value may be understood as the first threshold value described above, and the first and second weights w1 and w2 may be assigned as shown in Equation (1) to calculate the first threshold value.

As illustrated in operation S220 of FIG. 5, the threshold calculation unit 120 counts the number of pixels having the luminance values greater than the predetermined value in order to remove a light source portion that may exist in the image due to backlight.

Figure 6:
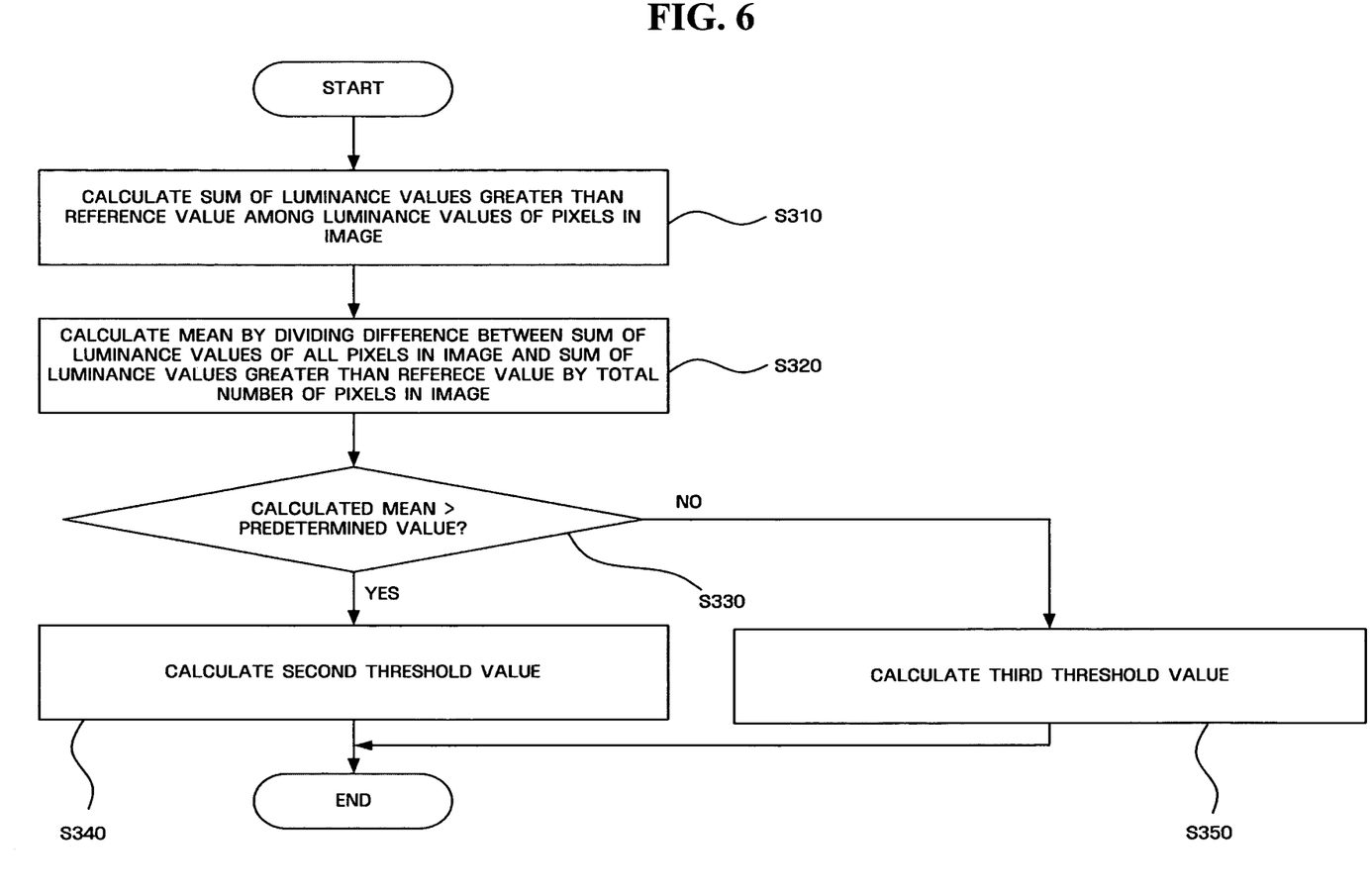
FIG. 6 is a flowchart illustrating a method of calculating a threshold value according to a second embodiment of the present invention.

FIG. 6 is a flowchart illustrating a method of calculating a threshold value according to a second embodiment of the present invention.

Referring to FIG. 6, the threshold calculation unit 120 calculates the sum of luminance values greater than a reference value among luminance values of all pixels in an image (operation S310). In addition, the threshold calculation unit 120 calculates a mean by dividing the difference between the sum of the luminance values of all pixels in the image and the sum of the luminance values of the pixels that are greater than the reference value by the total number of pixels in the image (operation S320).

If the calculated mean is greater than a predetermined value (operation S330), the threshold calculation unit 120 calculates the second threshold value (operation S340). If the calculated mean is not greater than the predetermined value (operation S330), the threshold calculation unit 120 calculates the third threshold value. In this case, the second and third threshold values may be calculated by assigning the third and fourth weights described above to the mean calculated in operation S320.

The third or fourth weights may be assigned according to the mean, which is determined based on a ratio of the sum of the luminance values greater than the reference value to the sum of the luminance values of all pixels in the image. In the second embodiment of the present invention, the number of luminance values greater than the reference value is relatively greater when the third weight is assigned than when the fourth weight is assigned. Therefore, the second threshold value is relatively greater than the third threshold value. In other words, the second threshold value is relatively greater than the third threshold value such that it can be used to detect a strong edge in the high-illuminance state. In addition, the third threshold value is relatively smaller than the second threshold value such that it can be used to consider even a weak edge in the low-illuminance state.

Figure 7A:
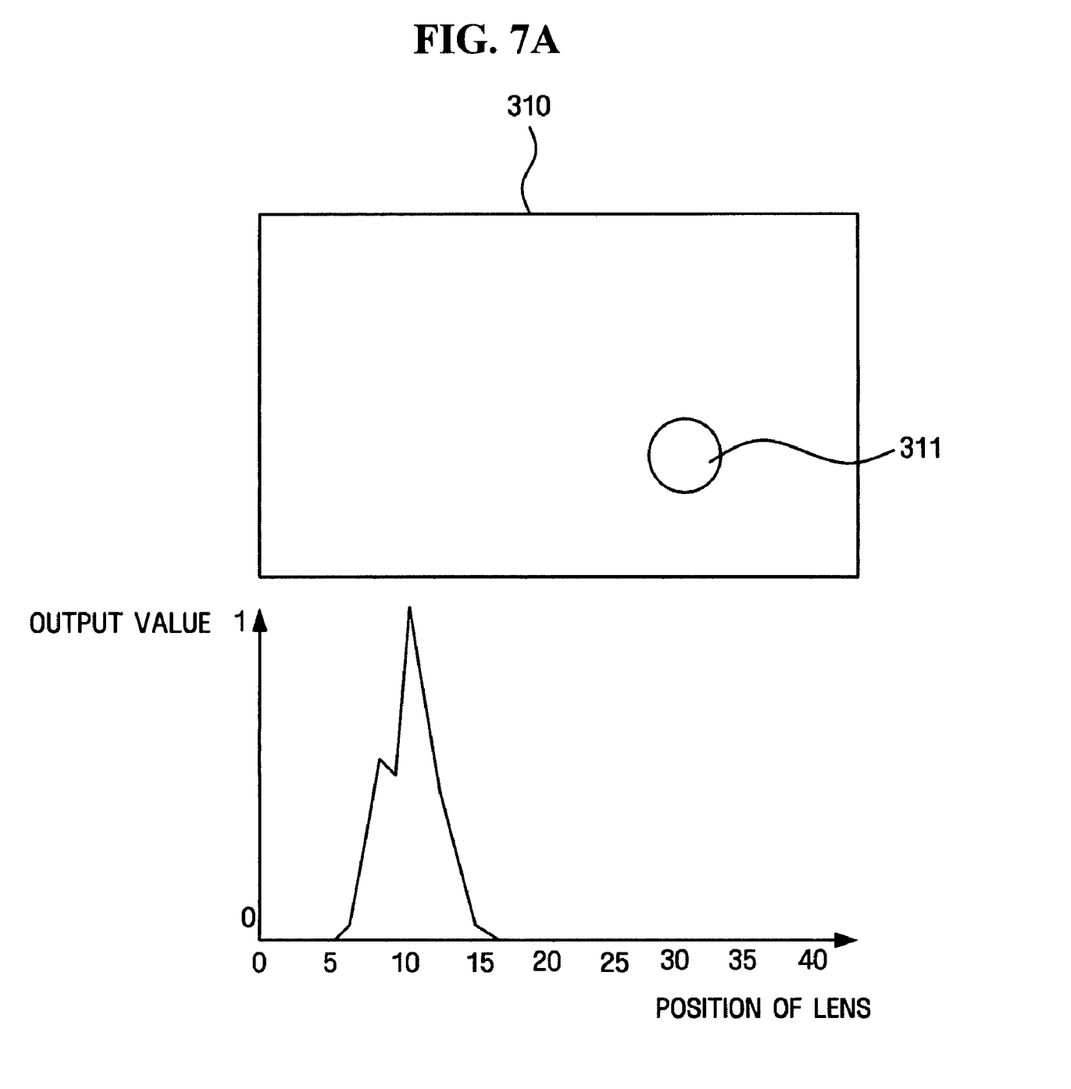
FIG. 7A is a diagram illustrating output values of the filter unit when a light source portion is removed from an image according to an embodiment of the present invention.
Figure 7B:
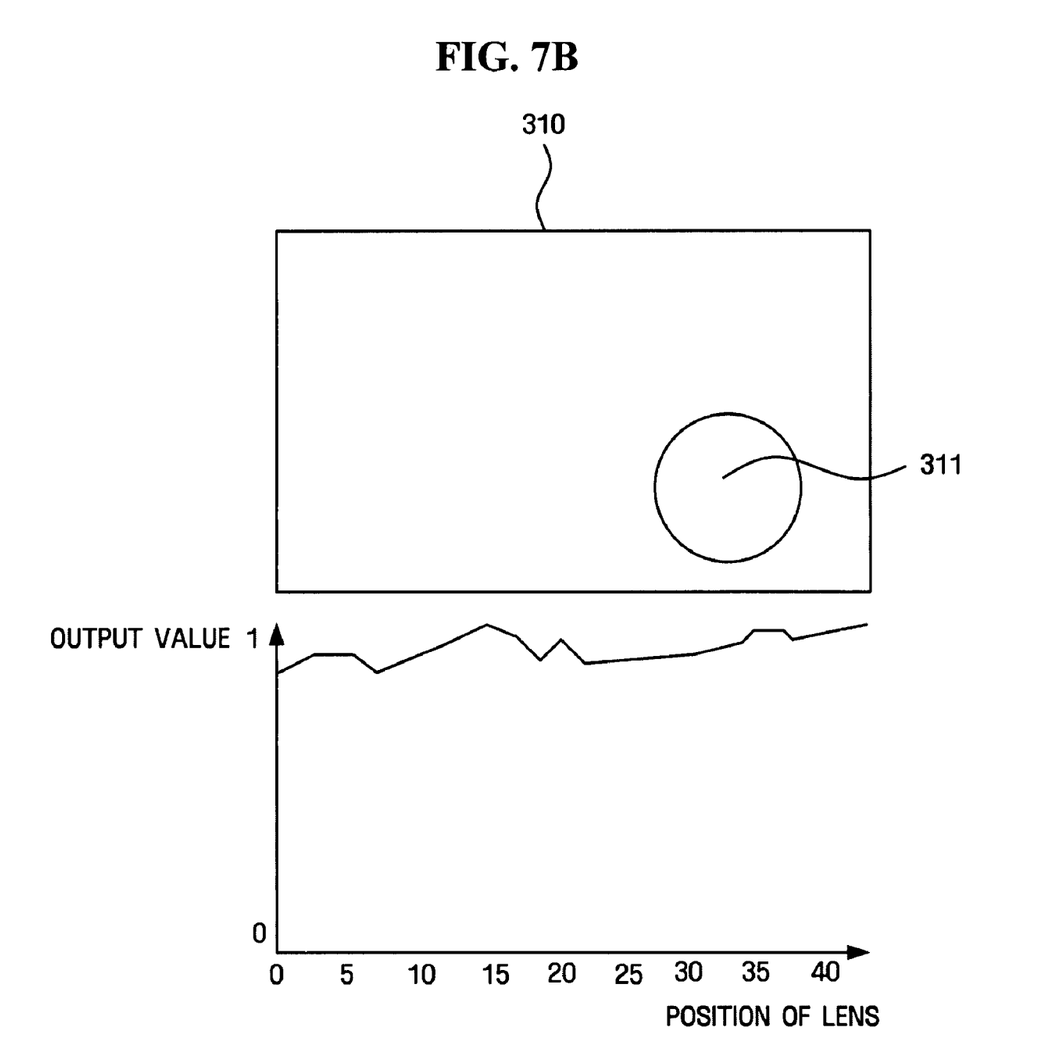
FIG. 7B is a diagram illustrating output values of the filter unit when the light source portion exists in the image of FIG. 7A.

FIGS. 7A and 7B are diagrams illustrating output values in the backlight state according to the embodiments of the present invention.

Referring to FIG. 7A, after a light source portion 311 is removed from an image 310 in a backlight state, a position of a lens having a maximum sum of output values of the filter unit 130 is at 11. On the other hand, referring to FIG. 7B, if the light source portion 311 is not removed from the image 310 in the backlight state, when the position of the lens is at 40, the sum of output values of the filter unit 130 is at a maximum even when the lens is out of focus, thereby causing malfunction.

Figure 8A:
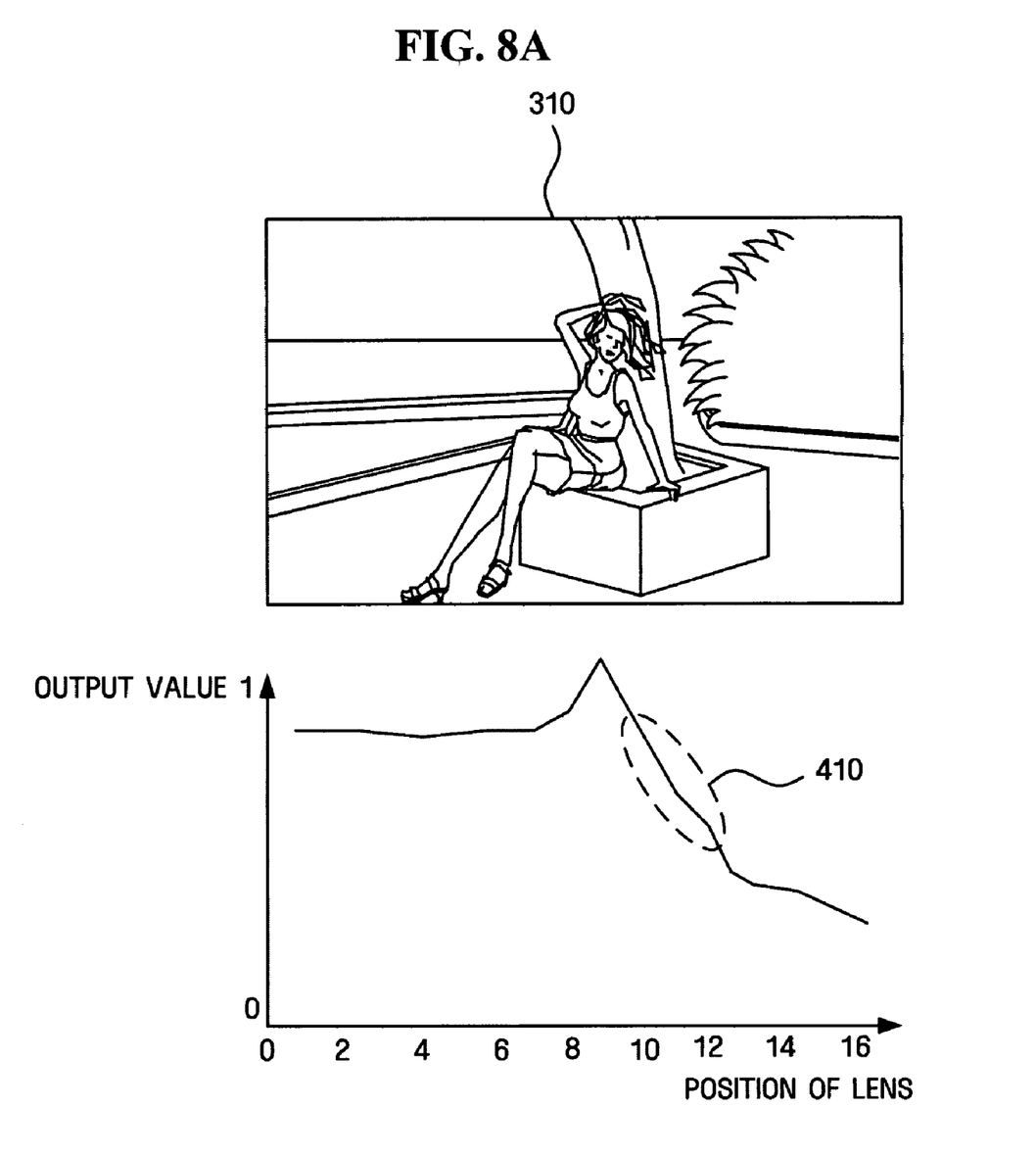
FIG. 8A is a diagram illustrating output values of the filter unit when a threshold value is adjusted in a low-illuminance state according to an embodiment of the present invention.
Figure 8B:
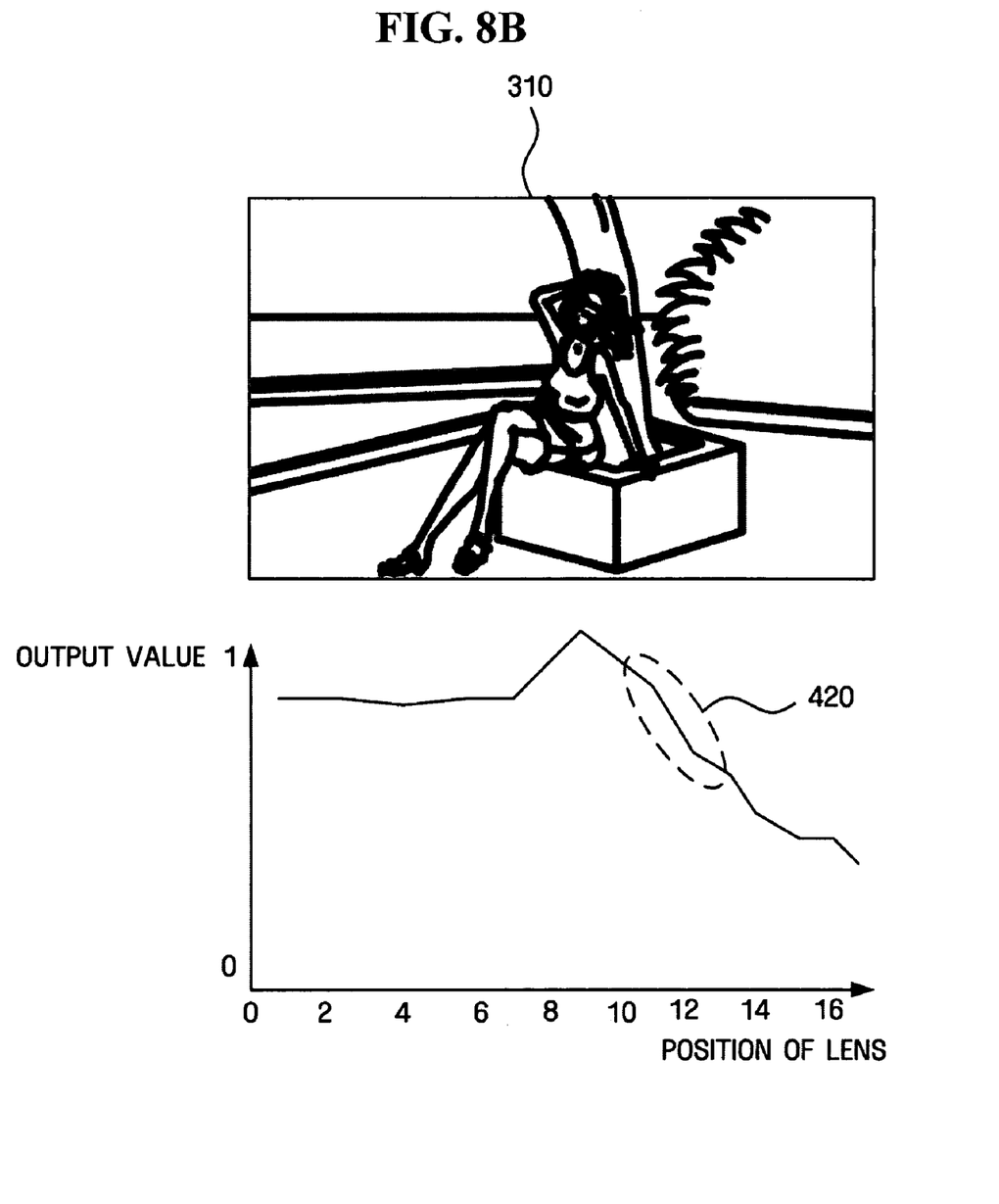
FIG. 8B is a diagram illustrating output values of the filter unit when the threshold value is not adjusted in the low-illuminance state of FIG. 8A.

FIGS. 8A and 8B are diagrams illustrating output values in the low-illuminance state according to the embodiments of the present invention.

Referring to FIG. 8A, when an image 310 is in the low-illuminance state, the filter unit 130 outputs values using the third threshold value, which is relatively smaller than the second threshold value. Therefore, a slope 410, shown in FIG. 8A, of a line formed by the sum of values output from the filter unit 130 using the third threshold value when a lens is in focus and when the lens is out of focus is steeper than a slope 420, shown in FIG. 8B, of a line formed by the sum of values output from the filter unit 130 using the third threshold value. Therefore, even in the low-illuminance state, the lens can be precisely focused using a steep slope of a line formed by the sum of output values. In other words, it is possible to precisely focus the lens by lowering the threshold value to be used by the filter unit 130 to output values in the low-illuminance state.

As described above, an apparatus and method to control the focusing of a photographing device according to the embodiments of the present invention can effectively remove a light source portion from an image in the backlight state. In addition, the apparatus and method use different threshold values in a high-illuminance state and a low-illuminance state. Hence, the focusing of the photographing apparatus can be effectively controlled in the high-illuminance state and the low-illuminance state.

The term 'unit', as used herein, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus to control a focusing of a photographing device, the apparatus comprising:
   a luminance detection unit detecting respective luminance values of pixels included in an image of a subject;
   a filter unit outputting values corresponding to the detected luminance values;
   a threshold calculation unit counting a number of the pixels having luminance values greater than a predetermined value and calculating a threshold value using a ratio of the counted number of pixels to a total number of the pixels included in the image; and
   a control unit controlling a position of a lens to focus on the subject using output values greater than the calculated threshold value among the output values of the filter unit.

2. The apparatus of claim 1, wherein the threshold calculation unit calculates the threshold value using a sum of the ratio and a mean of the luminance values of the pixels included in the image.

3. The apparatus of claim 1, wherein the control unit compares the output values of the filter unit with the calculated threshold value and calculates a sum of the output values greater than the calculated threshold value based on the comparison result.

4. The apparatus of claim 3, wherein the control unit controls the position of the lens such that the calculated sum of the output values greater than the calculated threshold value is maximized.

5. A method of controlling a focusing of a photographing device, the method comprising:
   detecting respective luminance values of pixels included in an image of a subject;
   outputting values corresponding to the detected luminance values;
   counting a number of pixels having luminance values greater than a predetermined value and calculating a threshold value using a ratio of the counted number of pixels to a total number of pixels included in the image; and
   controlling a position of a lens to focus on the subject using output values greater than the calculated threshold value among the output values.

6. The method of claim 5, wherein the counting of the number of pixels having luminance values greater than the predetermined value and the calculating of the threshold value comprises calculating the threshold value using a sum of the ratio and a mean of the luminance values of the pixels included in the image.

7. The method of claim 5, wherein the controlling the position of the lens comprises:
   comparing the output values with the calculated threshold value; and
   calculating a sum of the output values greater than the calculated threshold value based on the comparison result.

8. The method of claim 7, wherein the controlling the position of the lens comprises controlling the position of the lens such that the calculated sum of the output values is maximized.

* * * * *